US009421459B2

United States Patent
Ikeda

(10) Patent No.: US 9,421,459 B2
(45) Date of Patent: Aug. 23, 2016

(54) GAME APPARATUS, GAME REPLAY DISPLAYING METHOD, GAME PROGRAM, AND RECORDING MEDIUM

(75) Inventor: Ryuji Ikeda, Tokyo (JP)

(73) Assignee: KABUSHIKI KAISHA SQUARE ENIX, Tokyo (JP)

( * ) Notice: Subject to any disclaimer, the term of this patent is extended or adjusted under 35 U.S.C. 154(b) by 917 days.

(21) Appl. No.: 12/636,194

(22) Filed: Dec. 11, 2009

(65) Prior Publication Data

US 2010/0160040 A1     Jun. 24, 2010

(30) Foreign Application Priority Data

Dec. 16, 2008    (JP) ................................ 2008-320317

(51) Int. Cl.
| | | |
|---|---|---|
| A63F 13/497 | (2014.01) | |
| A63F 13/40 | (2014.01) | |
| A63F 13/577 | (2014.01) | |
| A63F 13/5255 | (2014.01) | |

(52) U.S. Cl.
CPC ............. *A63F 13/10* (2013.01); *A63F 13/5255* (2014.09); *A63F 13/577* (2014.09); *A63F 2300/634* (2013.01); *A63F 2300/6676* (2013.01)

(58) Field of Classification Search
CPC .............. A63F 13/497; A63F 13/5255; A63F 2300/634; A63F 2300/6676
USPC ...................................................... 463/30, 31
See application file for complete search history.

(56) References Cited

U.S. PATENT DOCUMENTS

| | | | |
|---|---|---|---|
| 5,779,548 A | | 7/1998 | Asai et al. |
| 6,210,273 B1 * | | 4/2001 | Matsuno ............................ 463/8 |
| 6,231,443 B1 * | | 5/2001 | Asai et al. ........................ 463/32 |
| 6,688,980 B2 * | | 2/2004 | Hirai et al. ....................... 463/31 |
| 6,699,127 B1 * | | 3/2004 | Lobb et al. ....................... 463/43 |

(Continued)

FOREIGN PATENT DOCUMENTS

| | | |
|---|---|---|
| JP | 2001-300143 | 10/2001 |
| JP | 2001-325612 | 11/2001 |

(Continued)

OTHER PUBLICATIONS

Dissidia Final Fantasy, published in "Weekly Famitsu", by Enterbrain, Inc., vol. 23, No. 51, published on Dec. 5, 2008 p. 23 and 33, along with a partial English translation.

(Continued)

*Primary Examiner* — Jay Liddle
(74) *Attorney, Agent, or Firm* — Greenblum & Bernstein, P.L.C.

(57) ABSTRACT

An object of the present invention is to provide a game apparatus that can replicate a game status by a replay display even in a game in which game result is changed by a character status or a game in which the game result is randomly changed within a constant range. In the game apparatus, the replay display of a game image obtained by causing the game to progress is performed in response to a replay display request of a player. In the game apparatus, perspective transformation of a virtual three-dimensional space is performed from a virtual camera onto a virtual screen to generate a two-dimensional image based on a character status, pad information inputted from the player, an initial value used to generate a random number during game progress, and virtual camera control information, and the replay display of the two-dimensional image is performed on a display device.

16 Claims, 10 Drawing Sheets

(56) References Cited

U.S. PATENT DOCUMENTS

| | | | |
|---|---|---|---|
| 6,724,385 B2* | 4/2004 | Takatsuka et al. | 345/427 |
| 6,758,756 B1* | 7/2004 | Horigami et al. | 463/43 |
| 2001/0000779 A1* | 5/2001 | Hayama et al. | 463/30 |
| 2001/0023201 A1* | 9/2001 | Takatsuka et al. | 463/31 |
| 2002/0082063 A1* | 6/2002 | Miyaki et al. | 463/1 |
| 2004/0219980 A1* | 11/2004 | Bassett et al. | 463/33 |
| 2007/0191096 A1 | 8/2007 | Tanaka | |
| 2008/0114801 A1* | 5/2008 | Singh | 707/102 |
| 2009/0305758 A1 | 12/2009 | Nomura | |

FOREIGN PATENT DOCUMENTS

| | | |
|---|---|---|
| JP | 2002-028371 | 1/2002 |
| JP | 2002-066132 | 3/2002 |
| JP | 2003-135844 | 5/2003 |
| JP | 2004-041645 | 2/2004 |
| JP | 2004-267247 | 9/2004 |
| JP | 2005-176933 | 7/2005 |
| JP | 2005-237673 | 9/2005 |
| JP | 2005-245795 | 9/2005 |
| JP | 2006-006853 | 1/2006 |
| JP | 2008-188051 | 8/2008 |
| WO | 96/00601 | 1/1996 |

OTHER PUBLICATIONS

Printed matters of the official site of "Dissidia Final Fantasy", uploaded Dec. 8, 2008.

Search report from E.P.O. in corresponding EP 09 17 9217, mail date Feb. 28, 2011.

Japan Office action in JP 2008-320317, dated Jan. 5, 2011 along with an english translation thereof.

Phinloda, "The commentaries for the making of the game program for Play Station final round; the addition of replay mode etc. ", Monthly C Magazine April Issue, Japan, Softbank Corp., vol. 9, Issue 4, Apr. 1, 1997, pp. 121-127.

Kenichiro Matsuura et al., "Mechanism od a Game; Shooting Game 9th round; Special Attack ", Monthly C Magazine November Issue, Japan, Softbank Corp., vol. 17, Issue 11 , Nov. 1, 2005, pp. 131-138.

Japan Office Action in JP 2008-320317, dated Oct. 11, 2011, and an English language translation thereof.

Japanese Office Action in JP 2008-320317, dated Aug. 21, 2012, together with an English language translation thereof.

* cited by examiner

FIG. 10

$ap+q=a'$ OFFENSIVE POWER 80
$p=76543$ DEFENSE POWER 50
$q=65432$

| a | ap+q | CAUSED DAMAGE |
|---|---|---|
| 735 | 56324537 | 27 |
| 736 | 56401080 | 24 |
| 737 | 56477623 | 33 |
| 738 | 56554166 | 30 |
| 739 | 56630709 | 28 |
| ⋮ | ⋮ | ⋮ |

GAME APPARATUS, GAME REPLAY DISPLAYING METHOD, GAME PROGRAM, AND RECORDING MEDIUM

CROSS REFERENCE TO RELATED APPLICATION

The present disclosure relates to subject matter contained in Japanese Patent Application No. 2008-320317, field on Dec. 16, 2008, the disclosure of which is expressly incorporated herein by reference in its entirety.

BACKGROUND OF THE INVENTION

1. Field of the Invention

The present invention relates to a game apparatus, in which a game is caused to progress in accordance with an input from a player, a game image obtained by causing the game to progress is displayed on a display device, and a replay display in which the game image is replicated is displayed on the display device in response to a replay display request of the player, a game replay displaying method, a game program, and recording medium.

2. Description of the Related Art

Conventionally, video games such as an action game and a sports game amuse many users. In the action game, a player operates a character to fight against an enemy character, thereby determining whether the character or the enemy character win the fight. The sports game emulates a real game such as baseball and soccer. A replay function is provided in some of the video games in which the action game and the sports game amuse many users. In the replay function, data for a predetermined time during game progress is stored in RAM, and a favorite scene can be selected and replicated. In replay display of the replay function in the conventional video game, a history of a signal is stored from a control pad operated by the player, the same image processing as the game is performed while the history of operation signal is read during the replay display, and the game image is replicated.

For example, International Patent Publication No. 1996/00601 discloses a game apparatus including a storage, a display data generator, and a display controller in order that a viewpoint of a camera is moved to perform the replay display while zoom-up or wide view is performed when the replay display of one scene of the game is performed. An absolute coordinate of a mobile object is stored in the storage in response to the operation of the player during the game progress. The display data generator reads the absolute coordinate from the storage in response to a replay request, and the display data generator produces display data by processing the absolute coordinate in accordance with processing information from an input device. The display controller controls the mobile object based on the produced display data such that the replay display of the mobile object is performed on the display device.

However, for the game apparatus disclosed in International Patent Publication No. 1996/00601, the absolute coordinate of the mobile object is stored in the storage, and only the replay display is performed based on the absolute coordinate. In the so-called action RPG (action Role Playing Game), despite of the action game, the player character is raised by gaining experience, and game result is changed by a character status of the character. In such complicated games, the game status cannot correctly be replicated by the replay display in the technique disclosed in International Patent Publication No. 1996/00601.

For the game such as the action RPG, for example, not only all damages caused to the enemy character depend on the character status of the character even if the player character attacks the enemy character, but also the result of the damage is randomly changed moment to moment within a constant range even in the same attacking method. Accordingly, for the technique disclosed in International Patent Publication No. 1996/00601, the game status cannot correctly be replicated by the replay display in the game in which the game result is randomly changed.

An object of the present invention is to provide a game apparatus that can correctly replicate the game status by the replay display even in the game in which the game result is changed by the character status of the character or the game in which the game result is randomly changed within a constant range, a game replay display method, a game program, and a recording medium. Another object of the present invention is to provide a game apparatus that can process and edit the status of the replicated game in accordance with player's preference.

SUMMARY OF THE INVENTION

In accordance with a first aspect of the present invention, a game apparatus, in which a game is caused to progress in accordance with an input from a player, a game image obtained by causing the game to progress is displayed on a display device, and a replay display in which the game image is replicated is displayed on the display device in response to a replay display request of the player, the game apparatus includes a motion input system that inputs motion input information for operating a player character in a virtual three-dimensional space in accordance with an operation of the player; a game progress controller that controls game progress in accordance with the motion input information; a storage that stores a character status of the player character, the motion input information, and an initial value used to generate a random number during the game progress in a storage region; a perspective transformer that reads the character status, the motion input information, and the initial value from the storage region in response to the replay display request of the player and performs perspective transformation of the virtual three-dimensional space from a virtual camera onto a virtual screen to generate a two-dimensional image based on the character status, the motion input information, the initial value, and virtual camera control information on control of a position, a focus, or an inclination of the virtual camera; and a display controller that performs the replay display using the two-dimensional image on the display device.

The character status of the character is stored in the storage region, and the replay display is performed based on the stored character status, so that one scene of the game can be replicated even in the game in which the game result is changed by the character status. The initial value that derives the random number generated during the game progress is stored in the storage region, and the replay display is performed based on the initial value, so that one scene of the game can be replicated even in the game in which the game result is randomly changed within a predetermined range although the game result depends on the character status of the character.

Preferably the game apparatus in accordance with the first aspect of the invention further includes a virtual camera control information input system that inputs virtual camera control information on the control of the position, the focus, or the inclination of the virtual camera in the virtual three-dimensional space in response to an operation of the player.

The position, focus, or inclination of the virtual camera can be controlled in accordance with the input of the player while the replay display of the game is performed, so that the replicated scene of the game can be edited in accordance with the player's preference. For example, various edits such as the edit around the player character, the edit around the enemy character operated by CPU, the edit looking down on the player character and the enemy character, the edit in which the position of the virtual camera is fixed, and the edit in which the game image is inclined at 45 degrees or 90 degrees can be performed.

In the game apparatus in accordance with the first aspect of the invention, preferably the storage stores the virtual camera control information in the storage region, and the perspective transformer reads the character status, the motion input information, the initial value, and the virtual camera control information from the storage region and performs the perspective transformation of the virtual three-dimensional space from the virtual camera onto the virtual screen to generate the two-dimensional image based on the character status, the motion input information, the initial value, and the virtual camera control information.

In accordance with the input of the player, the storage stores the virtual camera control information on the position, focus, or inclination of the virtual camera, which allows the replay display edited by the player to be replicated. The position, focus, or inclination of the virtual camera can be controlled again in accordance with the input of the player based on the replay display edited by the player, and the edit can be repeated until the player is satisfied.

Preferably the game apparatus in accordance with the first aspect of the invention further includes a data changer that converts the plurality of two-dimensional images into a moving image file.

Therefore, a way in which the player enjoys the game can widely spread such that the proud game image of the player is posted on the moving image posting site and is transmitted to a friend by an e-mail.

In accordance with a second aspect of the invention, a game replay displaying method performed by a computer apparatus, in which a game is caused to progress in accordance with an input from a player, a game image obtained by causing the game to progress is displayed on a display device, a replay display in which the game image is replicated is displayed on the display device in response to a replay display request of the player, the game replay displaying method includes controlling game progress in accordance with motion input information inputted in response to an operation of the player, the motion input information being used to operate a player character in a virtual three-dimensional space; storing a character status of the player character, the motion input information, and an initial value used to generate a random number during the game progress in a storage region; reading the character status, the motion input information, and the initial value, which are stored in the storage region, in response to the replay display request of the player; performing perspective transformation of the virtual three-dimensional space from a virtual camera onto a virtual screen to generate a two-dimensional image based on the character status, the motion input information, the initial value, and virtual camera control information on control of a position, a focus, or an inclination of the virtual camera; and controlling the generated two-dimensional image in order that the replay display is performed on the display device.

In accordance with a third aspect of the invention, a tangible computer-readable recording medium in which a game program executed by a computer apparatus is recorded, a game being caused to progress in accordance with an input from a player in the computer apparatus, a game image obtained by causing the game to progress being displayed on a display device in the computer apparatus, a replay display in which the game image being replicated is displayed on the display device in response to a replay display request of the player in the computer apparatus, the game program includes a motion inputting code segment that, when executed, inputs motion input information for operating a player character in a virtual three-dimensional space in response to an operation of the player; a game progress controlling code segment that, when executed, controls game progress in accordance with the motion input information; a storing code segment that, when executed, stores a character status of the player character, the motion input information, and an initial value used to generate a random number during the game progress of the game progress controller in a storage region; a perspective transforming code segment that, when executed, reads the character status, the motion input information, and the initial value, which are stored in the storage region, in response to the replay display request of the player and performs perspective transformation of the virtual three-dimensional space from a virtual camera onto a virtual screen to generate a two-dimensional image based on the character status, the motion input information, the initial value, and virtual camera control information on control of a position, a focus, or an inclination of the virtual camera; and a display controlling code segment that, when executed, controls the two-dimensional image in order that the replay display is performed on the display device.

BRIEF DESCRIPTION OF THE DRAWINGS

FIG. 10 illustrates a relationship between an initial value that becomes a seed of a random number and damage of the character from attack.

DETAILED DESCRIPTION OF THE INVENTION

Figure 1:
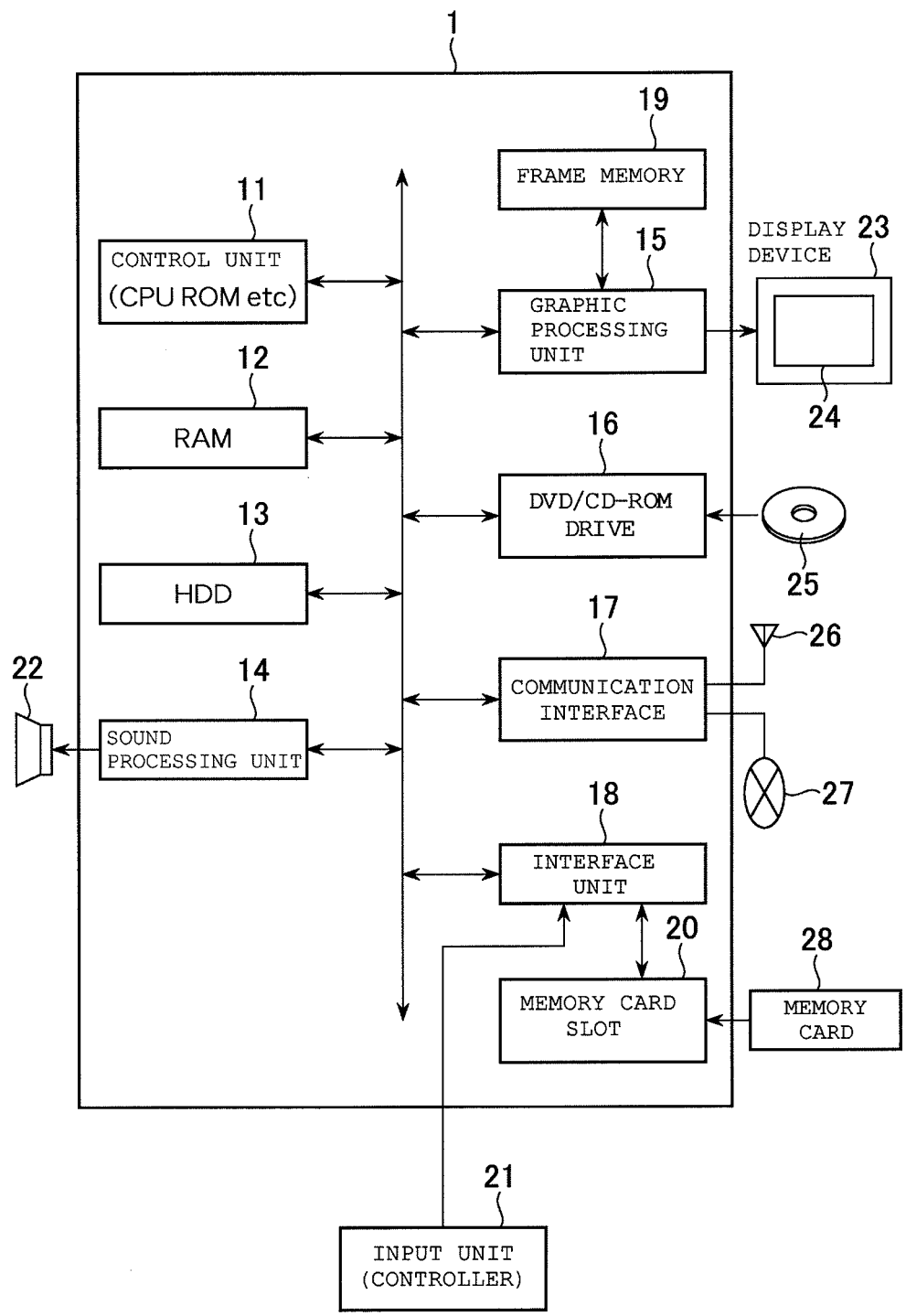
FIG. 1 is a block diagram illustrating a configuration of a video game apparatus according to an embodiment of the present invention that is used to play a three-dimensional video game.

An embodiment of the present invention will be described below with reference to the accompanying drawings. FIG. 1 is a block diagram illustrating a configuration of a video game apparatus according to an embodiment of the invention that is used to play a three-dimensional video game. The video game apparatus mainly includes an apparatus body 1. The apparatus body 1 includes a control unit 11, RAM (Random Access Memory) 12, a Hard Disk drive (HDD) 13, a sound processing unit 14, a graphic processing unit 15, a DVD/CD-ROM drive 16, a communication interface 17, and an interface unit 18, which are connected to one another through an internal bus.

The control unit 11 includes CPU (Central Processing Unit) and ROM (Read Only Memory), and the control unit 11 executes a program stored in HDD 13 or a recording medium 25 to control the apparatus body 1. The control unit 11 also includes an internal timer. RAM 12 is a work area for the control unit 11. HDD 13 is a storage region in which the program and data are stored.

The recording medium 25 such as DVD-ROM and CD-ROM in which the game program is stored can be mounted on the DVD/CD-ROM drive 16. The program and data, used to play the game with the video game apparatus, are stored in the recording medium 25. The program and data are read by the DVD/CD-ROM drive 16 and loaded on RAM 12.

The control unit 11 reads the data necessary for the game in progress from RAM 12 to perform processing. Because the RAM 12 has a storage capacity smaller than that of HDD 13 or the recording medium 25, only the necessary data is loaded on the RAM 12 from the recording medium 25 in accordance with a game progress status. The control unit 11 performs processing to the program and data loaded on RAM 12, provides a sound output instruction to the sound processing unit 14, and issues a drawing command to the graphic processing unit 15.

The sound processing unit 14 is connected to a sound output device 22 that is of a speaker. When the control unit provides the sound output instruction to the sound processing unit 14, the sound processing unit 14 supplies a sound signal to the sound output device 22.

The graphic processing unit 15 is connected to a display device 23 including a display screen 24. When the control unit 11 issues the drawing command, the graphic processing unit 15 expands an image on a frame memory (frame buffer) 19, and the graphic processing unit 15 supplies a video signal to display the image on a display screen 24 of the display device 23. For example, the image included in the video signal supplied from the graphic processing unit 15 has one frame time of 1/30second. The graphic processing unit 15 performs the drawing of one image in units of frame (that is, in units of 1/30second).

An input device (controller) 21 and a memory card slot 20 are connected to the interface unit 18. The input device 21 includes a directional key and plural operation buttons. The input device 21 is used to perform a predetermined motion such that a player character is moved by operating the directional key and such that an enemy player is attacked by operating the operation buttons. As described later, in editing the replay display, the directional key and the operation buttons are also used to perform a virtual camera control setting. Information inputted from the input device 21 based on a key pad operated by a player is stored in RAM 12, and the control unit 11 performs various pieces of calculation processing based on the input information.

In response to the instruction from the control unit 11, the interface unit 18 stores the data indicating the game progress status stored in RAM 12 in a memory card 28 mounted in the memory card slot 20, and the interface unit 18 reads the interrupted game data stored in the memory card 28 to transfer the data to RAM 12.

The communication interface 17 is connected to a communication network 27 in a wireless or wired manner. The communication interface 17 can perform wireless communication with another video game apparatus through a communication unit including an antenna 26.

Figure 2:
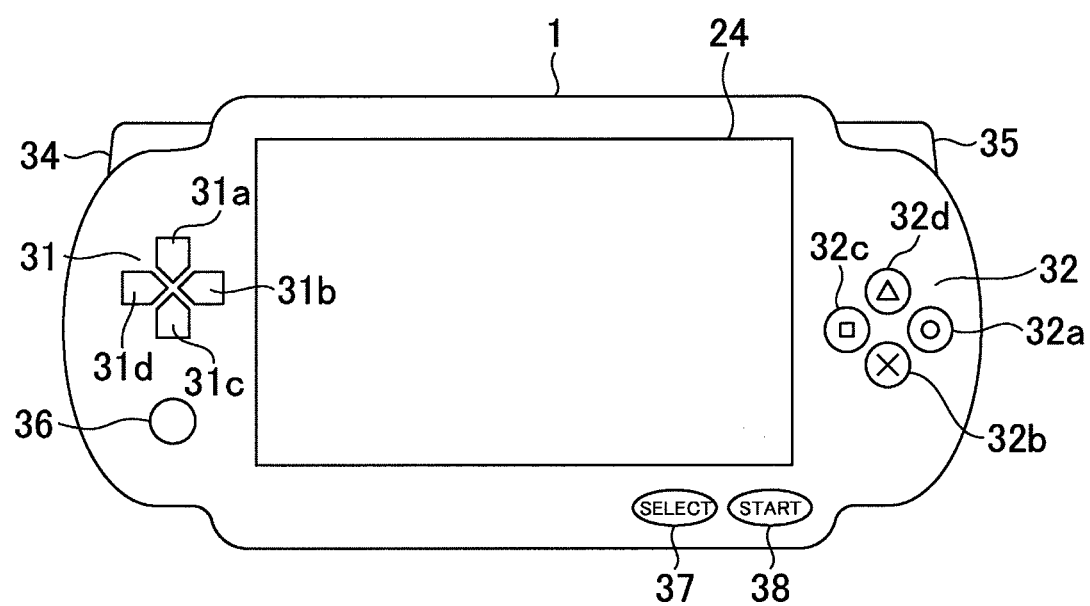
FIG. 2 illustrates an example of an apparatus body 1 of the embodiment.

FIG. 2 illustrates an example of the apparatus body 1 of the embodiment. The input device 21 and the display device 23 may be integrated with the apparatus body 1, or the input device 21 and the display device 23 may be provided independently of the apparatus body 1. In FIG. 2, the input device 21 and the display device 23 are integrated with the apparatus body 1.

An arrow key 31 is provided on the left of the apparatus body 1, and a button group 32 is provided on the right of the apparatus body 1. The arrow key 31 includes an upward key 31a, a rightward key 31b, a downward key 31c, and a leftward key 31d. The button group 32 includes a "○" mark button 32a, a "x" mark button 32b, a "□" mark button 32c, and a "Δ" mark button 32d. The display screen 24 is provided in a central portion of the apparatus body 1, and a select button 37 and a start button 38 are provided on a lower side of the display screen 24. Further, plural buttons such as an R button 34 and an L button 35 are provided in a side portion of the apparatus body 1. A joystick 36 is provided on the left of apparatus body 1 and on the lower side of the arrow key 31.

When a pressing force is applied to each of the arrow key 31, the "○" mark button 32a, the "x" mark button 32b, the "□" mark button 32c, the "Δ" mark button 32d, the select button 37, the start button 38, the R button 34, and the L button 35, a corresponding switch is turned on. The input device 21 produces a detection signal in accordance with the turn-on/off of the switch. The input device 21 also produces a detection signal corresponding to an inclined orientation of the joystick 36.

The switch-system detection signal produced by the input device 21 is supplied to the interface unit 18, and the switch-system detection signal becomes detection information indicating which button is turned on. For the joystick 36, the joystick-system detection signal becomes detection information indicating a state of the joystick 36. The operation instruction that the player provides to the input device 21 is supplied to the apparatus body 1.

In the video game of the embodiment, a virtual three-dimensional space is formed as a player character moving space, and the player operates the input device 21 to provide the instruction to the player character to cause the game to progress. A position in the virtual three-dimensional space is uniquely specified by a coordinate of a world coordinate system (X, Y, Z). Graphic data in the virtual three-dimensional space is formed by plural polygons in which a coordinate of each apex is expressed by the coordinate of the world coordinate system.

The player character is formed by plural polygons in which a coordinate of each apex is expressed by a coordinate of a local coordinate system (x, y, z). In the player character, a substantially central point is set as a reference point, and the position in the virtual three-dimensional space is expressed by the coordinate of the reference point in the world coordinate system.

A direction of the player character is expressed by an angle formed between each axis of the local coordinate system and each axis of the world coordinate system. In performing display processing, the coordinate of the apex of each polygon forming the player character is converted into the coordinate of the world coordinate system. A traveling direction of the player character is determined based on a relationship between a position of the player character in a current frame and a position of the player character in a previous frame.

Figure 3:
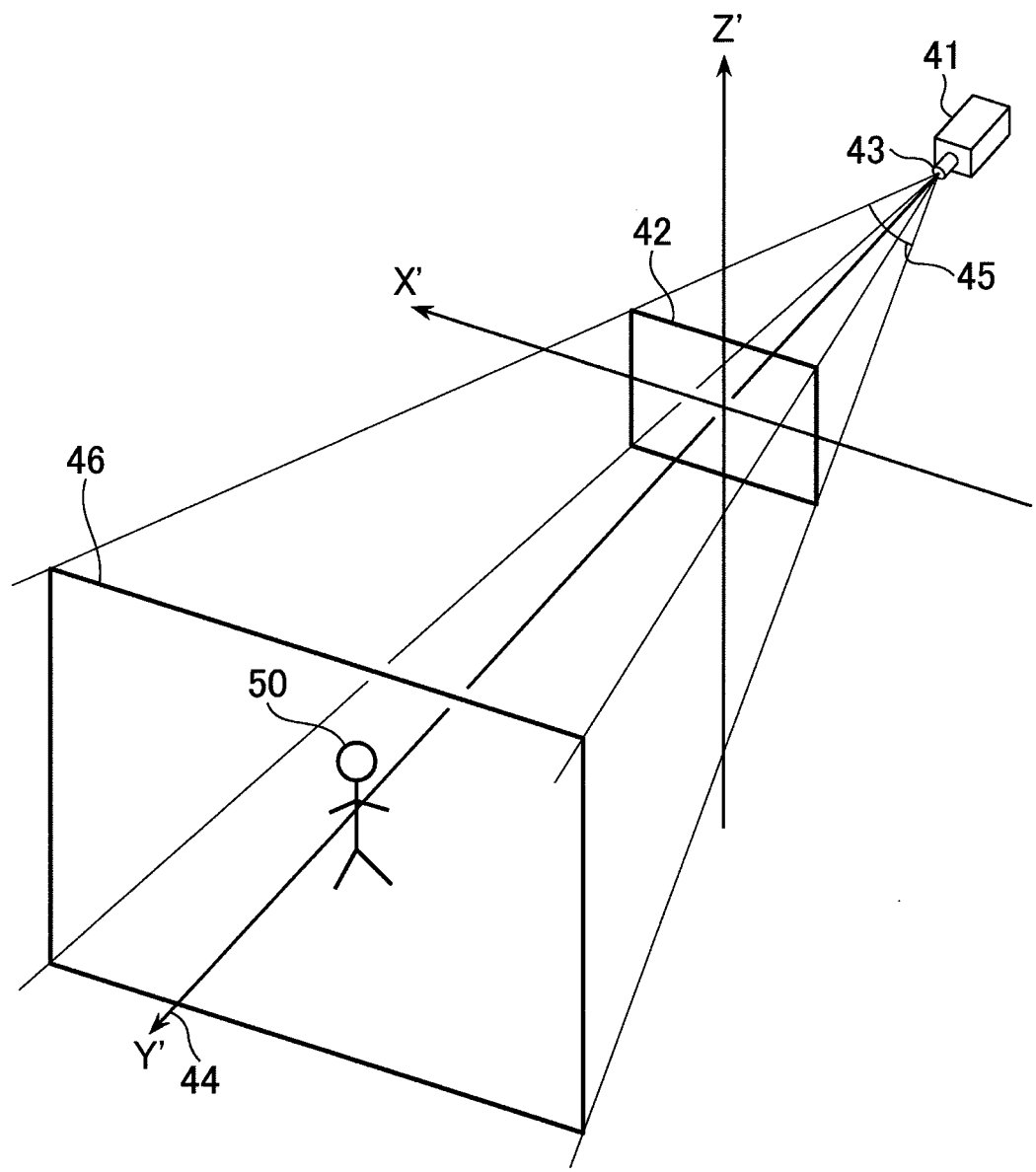
FIG. 3 schematically illustrates perspective transformation.

FIG. 3 schematically illustrates a perspective transformation method. In the embodiment, during the game progress (during player operation) and the game replay display, the motion of the player character in the virtual three-dimensional space is projected on the display screen 24 by performing perspective transformation of the virtual three-dimensional space with a virtual camera.

A virtual camera 41 is placed in the virtual three-dimensional space, and an image projected on the virtual screen 42 becomes an image displayed on the display screen 24. A position of the virtual camera 41 becomes a viewpoint 43, an orientation of the virtual camera 41 becomes a visual axis 44, a region formed by four straight lines connecting the viewpoint 43 and four corners of the apexes of the virtual screen 42 becomes a view 45. A size of the virtual screen 42 is fixed. The position of the virtual screen 42 is determined when the size of the view 45 is determined, and a size of the view 45 is determined when the position of the virtual screen 42 is determined. A clip surface 46 is defined at a predetermined distance away from the viewpoint 43 in a direction of the visual axis 44, and a clipping range, that is, a range where the image is produced by the perspective transformation in the virtual three-dimensional space becomes a range from the virtual screen 42 to the clip surface 46 within the range of the view 45.

The coordinate system used to project the image onto the virtual screen 42 is a viewpoint coordinate system (X', Y', Z'), and the direction of the visual axis 44 becomes a Y'-axis of the viewpoint coordinate system. The coordinate of the world coordinate system is converted into the coordinate of the viewpoint coordinate system to perform the perspective transformation processing including hidden surface removal processing. When the image projected onto the virtual screen 42 is produced by the perspective transformation, it is necessary to perform hidden surface removal that removes a surface hidden behind another object. A Z-buffer method can be used as the hidden surface removal.

Before the perspective transformation is performed, it is necessary to determine the viewpoint 43 of the virtual camera 41, the direction of the visual axis 44, the size (distance from viewpoint 43 to the virtual screen 42) of the view 45, and a distance (hereinafter referred to as clipping distance) from the viewpoint 43 to the clip surface 46 (position of the virtual screen 42 is inevitably determined when these parameters are determined). The position of the viewpoint 43 is maintained at a constant distance from a player character 50, and the position of the viewpoint 43 moves while following the player character 50. Usually the direction of the visual axis 44 is set so as to be always orientated toward the reference point of the player character 50. Basically the size of the view 45 and the clipping distance are set equal to each other. As described later, in the embodiment, the player can edit the position, focus (reference point), or inclination of the virtual camera 41 for replay data, and the player can control the position of the viewpoint 43 and the direction of the visual axis 44.

Figure 4:
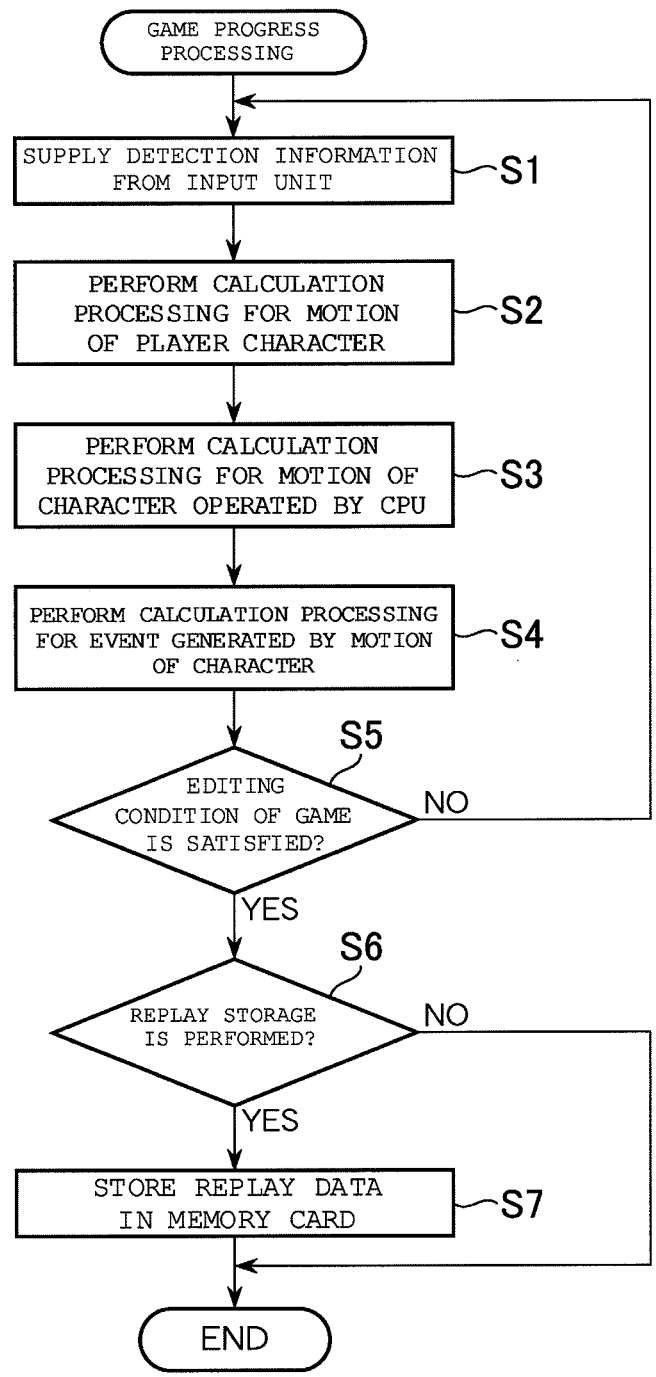
FIG. 4 is a flowchart illustrating game progress processing in the three-dimensional video game of the embodiment.

FIG. 4 is a flowchart illustrating game progress processing in the three-dimensional video game of the embodiment. The case, in which the player character operated by the player fights against an enemy character operated by CPU, will be described in the embodiment. The player performs the key input to the input device 21 to provide the instruction on the motion (where the player character moves, how the player character attack the enemy character, or which magic the player character uses) of the player character. The input device 21 supplies the detection information in units of frame (Step S1). CPU of the control unit 11 performs calculation processing of the motion of the player character based on the detection information (Step S2). The calculation processing is performed in units of frame.

CPU of the control unit 11 performs calculation processing of the motion (where the enemy character moves, how the enemy character attack the player character, or which magic the enemy character uses) of the enemy character operated by CPU (Step S3). The calculation processing is performed in accordance with an algorithm of a predetermined game program, and an individual algorithm is set in each kind of the enemy character. For example, a predetermined algorithm is set such that the enemy character comes close to the player character to attack the player character, such that the enemy character attacks the player character with magic while keeping a predetermined distance from the player character, or such that the enemy character gives up to attack the player character to escape when HP (Hit Point, HP is a physical strength set in each character, and the character cannot act when the physical strength becomes zero) of the enemy character becomes a half or less.

When the player character or the enemy character operated by CPU perform the attack or magic to generate an event (for example, HP of the attacked opponent character decreases, HP of the character recovers by recovery magic, and an offensive power of the character rises by auxiliary magic in a fixed period of time), the calculation processing is performed to the effect of the generated event (Step S4). In the calculation processing, the decrease in HP of the opponent character, the recovery of HP of the character that becomes a target of the recovery magic, and the enhancement effect of the character status such as the offensive power within a predetermined time are determined in accordance with the motion (such as attack, recovery magic, and auxiliary magic) selected by the character based on the character statuses of the player character and enemy character.

Examples of the character statuses of the player character and enemy character include an offensive power, a defense power, quickness, a magic power, a magic defense power, and luck. The damage that the character can cause in attacking the opponent character is determined in accordance with the offensive power of the attacking character and the defense power of the attacked character, and the damage that the character can cause in working attack magic on the opponent character is determined in accordance with the magic power of the character who works the attack magic, the magic defense power of the attacked character, and magnitude of the damage effect set in each pieces of attack magic.

Not only the effect of each event is determined by the character statuses of the player character and enemy character, but also the effect is changed in accordance with a randomly-generated random number. Although the effect of the event is restricted to a predetermined range in accordance with the character statuses of the player character and enemy character, a value of the effect of the event is determined in accordance with the random number. Usually the random number is generated using a function for generating the random number and an initial value (random seed) that becomes a seed of the random number. Well-known methods and functions such as a mixed congruential method and a middle-square method can be adopted as a method (function) for generating the random number, and there is no particular limitation to the random number generating method as long as the pseudo-random number can be generated. For example, an occurrence time of the event can be used as the initial value that becomes the seed of the random number. For example, when the occurrence time of the event is 9:12:15 a.m., only minute and second are extracted and converted in units of second, and "735" is derived from "12×60+15". "735" is used as the initial value. FIG. 10 illustrates a relationship between the initial value that becomes the seed of the random number and the damage of the character from the attack. At this point, the random number is generated by the mixed congruential method. In the mixed congruential method, an equation (1) is used:

$$a \times p + q = a' \quad \text{[Formula 1]}$$

where p and q are arbitrarily-selected constants. In this case, P=76543 and Q=65432. The initial value is substituted for a to obtain a'. The ten thousands place, the thousands place, the hundreds place, and the tens place are extracted to obtain a four-figure number. The obtained four-figure number becomes the random number. For example, when the initial value is "735", a value of "56324537" is obtained by the equation, and the random number becomes "2453". Similarly, the random number becomes "108" when the initial value is "736", the random number becomes "7762" when the initial value is "737", and the random number becomes "5416" when the initial value is "738". The effect of the event is calculated using the obtained random numbers.

For example, when the player character attacks the enemy character, the damage of the enemy character is calculated from an equation (2) using the obtained random numbers:

$$\text{Damage} = (\text{Offensive power} - \text{Defense power}) \times \left( \frac{0.8 + \text{Random number}}{25000} \right) \quad \text{[Formula 2]}$$

where an offensive power is the offensive power of the player character, and a defense power is the defense power of the enemy character. For example, when the player character has the offensive power of "80" while the enemy character has the defense power of "50", because the random number runs from 0 through 9999, the enemy character sustains the damage in a range of ±20% of "30" obtained by subtracting the defense power from the offensive power, that is, in a range of 24 to 36 points. Accordingly, the enemy character sustains the damage of "27" when the initial value is "735". Similarly, the enemy character sustains the damage of "24" when the initial value is "736", the enemy character sustains the damage of "33" when the initial value is "737", and the enemy character sustains the damage of "30" when the initial value is "738". The random number is generated using the function for generating the pseudorandom number, and the effect of the event is calculated based on the random number, so that the random calculation result can be obtained within a predetermined range that is determined in accordance with the status of the character.

In the embodiment, the random number is generated in the calculation processing for the effect of the event in Step S4. Alternatively, the random number may be generated in the calculation processing for the motion of the enemy character in Step S3. When the random number is generated in the calculation processing for the motion of the enemy character, that is, when the motion of the enemy character is randomly changed even if the player performs exactly the same operation, the game status can be replicated by replay display. As described above, the occurrence time of the event can be used as the initial value that becomes the seed of the random number, and the well-known methods and functions such as the mixed congruential method and the middle-square method can be adopted as the method (function) for generating the random number.

As a result of the event generation in Step S4, when an ending condition of the game is satisfied (YES in Step S5), the game ends and the player is required to determine whether replay storage is performed such that the string of statuses of the game can be replicated. The case in which the ending condition of the game is satisfied usually means the case in which HP of one of the player character and the enemy character becomes "0". However, another condition may be set as the ending condition of the game. For example, the case in which predetermined times of a specific attack is performed to the enemy character or the case in which HP of a particular boss character becomes "0" even if plural enemy characters exist may be set as the ending condition of the game. The different ending condition of the game may be set in each stage of the game caused to progress by the player. When the ending condition of the game is not satisfied (NO in Step S5), the processing is repeated from Step S1, and the game continues until the ending condition of the game is satisfied. Although not illustrated, the calculation processing for the perspective transformation is performed based on the each result of the calculation processing for the motion of the player character in Step S2, the calculation processing for the motion of the enemy character in Step S3, and the calculation processing for the event generated by the motion of the character in Step S4. The result of the calculation processing for the perspective transformation is written in the frame memory 19 and displayed on the display device 23. The player makes the progress of the game based on the game image displayed on the display device 23.

When the ending condition of the game is satisfied (YES in Step S5), the player is required to determine whether the replay storage is performed. When the replay storage is performed by the input of the player with the input device 21 (YES in Step S6), a replay data including the statuses of the player character and enemy character, the motion input information that is inputted into the input device 21 by the player in order to operate the player character during the game progress, and the initial value that is used to generate the random number during the game progress are stored in the memory card 28 (Step S7). In the motion input information, the detection information on each key of the arrow key 31, each button of the button group 32, and each joystick 36, in frame, is stored. For example, when 30 frames are displayed per second, the motion input information on the player of 300 frames is stored in order to be able to perform the replay for 10 seconds. When the storage processing for the memory card 28 ends (Step S7), or when the replay storage is not performed (NO in Step S6), the game progress processing ends to start the game progress processing for the next stage.

In the embodiment, the player determines whether the replay storage is performed based on whether the ending condition of the game is satisfied. However, the player can arbitrarily determine whether the replay storage starts in order to perform the replay display or the replay storage ends.

Figure 5:
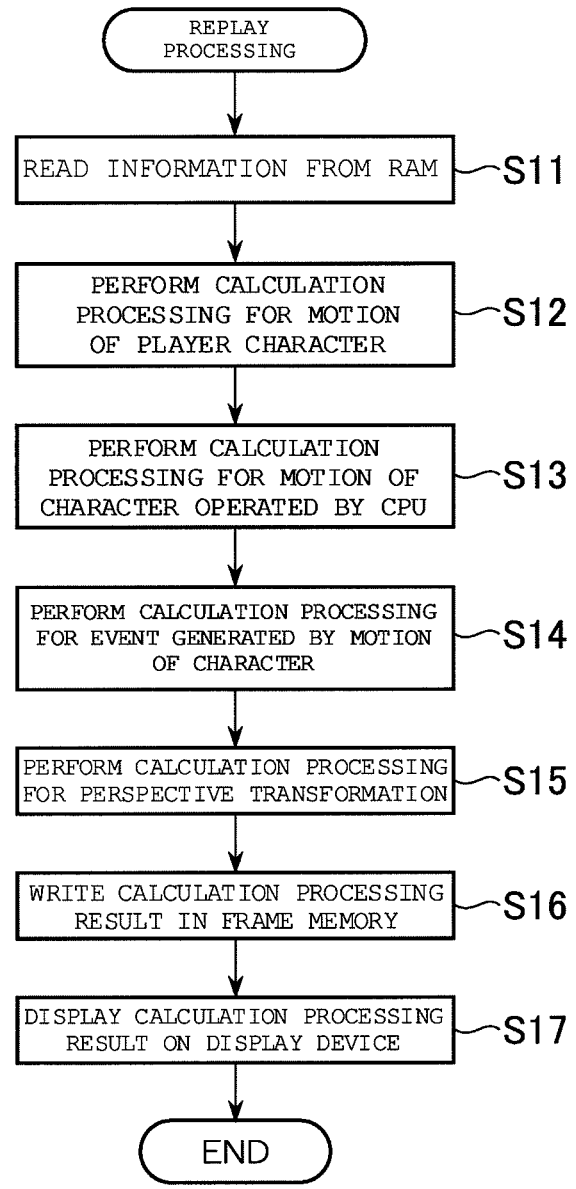
FIG. 5 is a flowchart illustrating replay processing in the three-dimensional video game of the embodiment.

FIG. 5 is a flowchart illustrating replay processing in the three-dimensional video game of the embodiment. The replay data to which the replay storage is performed after the player causes the game to progress, and the replay data which is edited by the player based on the replay data to which the replay storage is performed, become the target of the replay processing. The processing in which the player performs the edit based on the replay data to which the replay storage is performed is described later.

When the player makes a request of replay display with the input device 21, information memory loaded from the memory card 28 onto RAM 12 is read (Step S11). The read information includes the character statuses of the player character and enemy character, the motion input information for each frame unit that is inputted into the input device 21 by the player, and the initial value that is used to generate the random number during the game progress. The character statuses, the motion input information, and the initial value are used in each calculation processing. When the replay display is performed again to the replay data that is edited by the player based on the replay data to which the replay storage is performed, virtual camera control information on the control of the position, focus, or inclination of the virtual camera, which is edited by the player, is also read, and the calculation processing for the perspective transformation is performed based on the virtual camera control information. When the replay display is performed to the replay data to which the replay storage is performed after the player causes the game to progress, the calculation processing for the perspective transformation is performed based on the virtual camera control information that is set by default unless the player performs the input.

CPU of the control unit 11 performs the calculation processing for the motion of the player character (Step S12).

The calculation processing is performed based on the motion input information on each key of the arrow key 31, each button of the button group 32, and each joystick 36, in frame, read from the memory card 28.

CPU of the control unit 11 performs the calculation processing for the motion of the enemy character (Step S13).

The calculation processing is performed in accordance with an algorithm of a predetermined game program, and an individual algorithm is set in each kind of the enemy character. When the random number is generated in the calculation processing for the motion of the enemy character in Step S3, the initial value used to generate the random number is used to perform the calculation processing. In the calculation processing, the initial value used during the game progress is used, and the random number is generated using the same function.

Therefore, the same calculation result can be obtained to replicate the motion of the enemy character in the past game progress.

When the player character or the enemy character operated by CPU makes the attack or magic to generate the event, the calculation processing is performed to the effect of the generated event (Step S14). The character statuses of the player character and enemy character and the initial value used to generate the random number during the game progress are read from RAM 12, the decrease of HP of the opponent character, the recovery of HP of the character that becomes a target of the recovery magic, and the enhancement effect of the character status such as the offensive power within a predetermined time are determined in accordance with the motion (such as attack, recovery magic, and auxiliary magic) selected by the character. In the calculation processing, the initial value used during the game progress is used, and the random number is generated using the same function.

Therefore, the same calculation result can be obtained to replicate the effect of the event generation in the past game progress status.

When the occurrence time of the event is used as the initial value that becomes the seed of the random number, not the initial value but only a game starting time (fight starting time) is stored in the storage region, and the game starting time may be utilized in performing the replay display. That is, which frame of each event is generated in the game replay display after the game starts is stored in the replay data.

Accordingly, because the occurrence time of the event can be specified from the game starting time, the effect of the event generation can be calculated based on the occurrence time of the event that is of the initial value. Sometimes plural events are generated even if the replay display is performed to one scene of the game. When the game starting time is stored, the replay display can be performed even if all the occurrence times of the events are not stored as the initial value, which leads to the reduction of a storage capacity of the memory card 28.

The calculation processing for the perspective transformation is performed based on the each calculation result of the calculation processing for the motion of the player character in Step S12, the calculation processing for the motion of the enemy character in Step S13, and the calculation processing for the event generated by the motion of the character in Step S14 (Step S15). When the replay display is performed to the replay data to which the replay storage is performed after the player causes the game to progress, the calculation processing for the perspective transformation is performed based on the virtual camera control information set by default. When the replay display is performed again to the replay data that is edited by the player based on the replay data to which the replay storage is performed, the virtual camera control information on the control of the position, focus, or inclination of the virtual camera, which is edited by the player, is read from RAM 12, and the calculation processing for the perspective transformation is performed based on the virtual camera control information. However, even in the replay display, the player can perform the input into the input device 21 to control the position, direction, and focus of the virtual camera, and the player can press the arrow key 31, R button 34, and L button 35 to change the camera mode. Therefore, the player can rotate the position of the virtual camera around the player character with the joystick 36, and the player can change the distance between the player character and the virtual camera. Consequently, even in the replay display, the position and direction of the virtual camera can be controlled in real time. The result of the calculation processing for the perspective transformation is written in the frame memory 19 (Step S16), and the result of the calculation processing is displayed on the display device 23 (Step S17).

The replay processing continues until the displays of all the pieces of replay data read from the memory card 28 ends.

Figure 6:
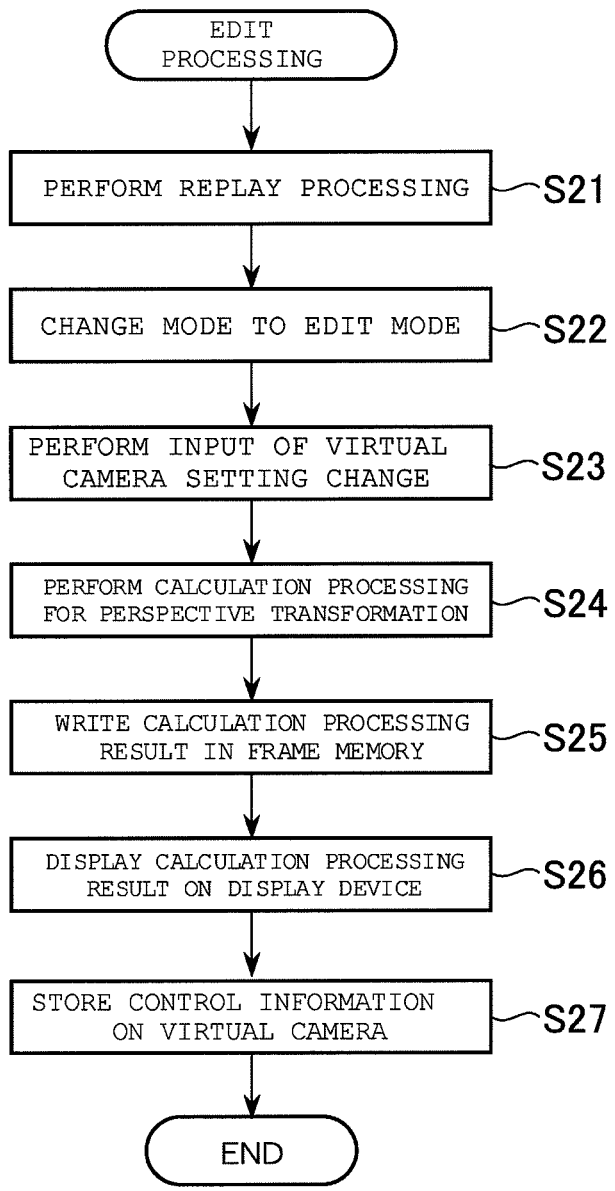
FIG. 6 is a flowchart illustrating edit processing in the three-dimensional video game of the embodiment.

FIG. 6 is a flowchart illustrating edit processing in the game apparatus of the embodiment. When the player makes a request of the replay display with the input device 21, the replay processing in Steps S11 to S17 is performed (Step S21), and the replay display of the game image is performed on the display screen 24. When the player makes a request to change the mode to the edit mode with the input device 21 during the replay display, the mode is changed to the edit mode (Step S22). At this point, temporary suspension can be performed even in the replay display. The mode can also be changed to the frame-by-frame advance or slow motion, and the time can freely be controlled in the replay display.

In the edit mode, the change of the position, direction, focus, and inclination of the virtual camera is inputted in response to the operation of the player (Step S23). The calculation processing for the perspective transformation is performed based on the calculation processing for the motion of the player character (Step S12), the calculation processing for the motion of the enemy character (Step S13), and the calculation processing for the event generated by the motion of the character (Step S14), which are performed in the replay processing, and the setting information on the position, direction, or focus of the virtual camera, which is inputted in Step S23 (Step S24).

The result of the calculation processing in Step S24 is written in the frame memory 19 (Step S25) and displayed on the display device 23 (Step S26). As a result of the display of the game screen on the display device 23 in Step S26, when the player determines that the virtual camera control information is registered, the virtual camera control information is stored in RAM 12 (Step S27). When all the replay displays end to terminate the edit, the player selects whether the replay storage of the edit result is performed.

When the replay storage of the edit result is performed, the post-edit virtual camera control information is stored as the new replay data in the memory card 28, along with the character statuses of the player character and enemy character and the motion input information. The character statuses of the player character and enemy character and the motion input information stored in RAM 12. The replay display of the stored replay data is performed, which allows the replay display to be performed to the game status in which the setting of the virtual camera is edited.

Figure 7:
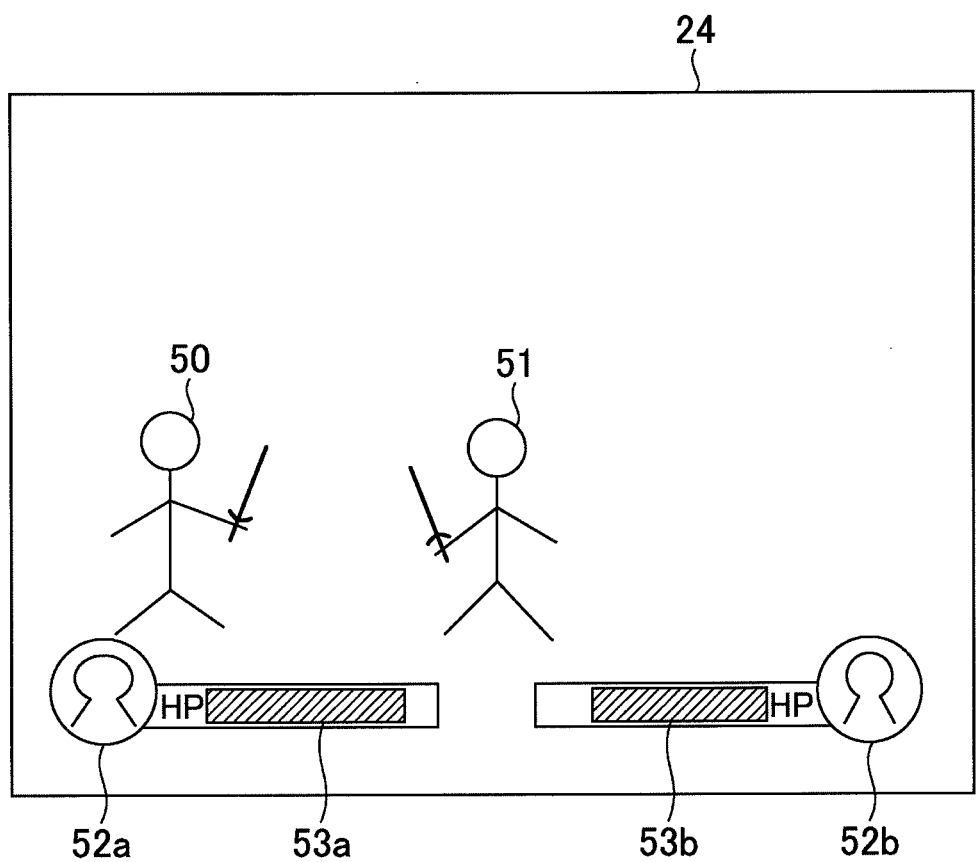
FIG. 7 illustrates an example of a display screen 24 during game progress and replay display.

FIG. 7 illustrates an example of the display screen 24 during the game progress and the replay display. The player character 50 and an enemy character 51 are displayed in a central portion of the display screen 24. Character display regions 52a and 52b are provided in a lower portion of the display screen 24 for the player character 50 and enemy character 51, respectively. Images of the characters are displayed in the character display regions 52a and 52b. HP display regions 53a and 53b are also provided to display values of HP of the characters, and the player can intuitively recognize HP of each character. A remaining amount of HP is increased, as a black portion of the HP display region 53 is increased.

Figure 8:
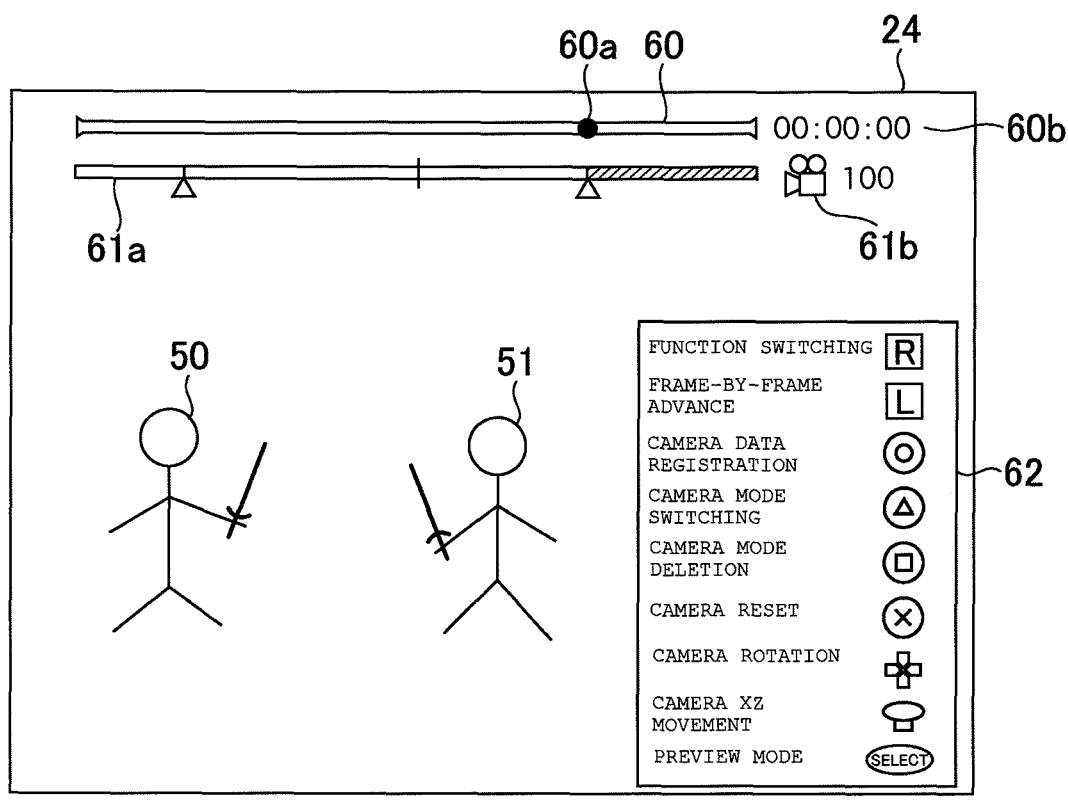
FIG. 8 illustrates an example of a display screen 24 during edit.

When the player makes a request to change the mode to the edit mode with the input device 21 during the replay display, the display screen 24 is changed to an edit screen of FIG. 8. When the mode is changed to the edit mode, the replay display is temporarily suspended to change the display screen 24 to a still screen. As with the display screen of FIG. 7, the player character 50 and the enemy character 51 are displayed in the central portion of the display screen 24. However, the character display region 52 and the HP display region 53 are not displayed on the display screen 24. Instead of the character display region 52 and the HP display region 53, a replay time display region 60 is displayed in an uppermost portion of the display screen 24, a frame display region 61a is displayed immediately below the replay time display region 60, and an edit function display region 62 is displayed on the right of the display screen 24.

The replay time display region 60 expresses a relationship between a total display time of the replay display and an elapse time until the currently reproducing game screen since the replay display starts. That is, the replay time display region 60 expresses where data in a time position is being reproduced in all the pieces of replay data. When the replay display starts, the time display point 60a moves from the left end of the replay time display region 60 toward the right end. The replay display ends when the time display point 60a moves to the right end of the replay time display region 60. The elapse time since the replay display starts is displayed in a timer 60b.

The frame display region 61a expresses information on previous and next hundreds frames when a vertical line in the center of the gage is set to the current frame. When the replay data to which the replay storage is performed after the player causes the game to progress is edited, the frame display region 61a is expressed in black and gray. The black expresses the frame (frame in which the position, direction, focus, and inclination of the virtual camera are not changed) in which camera key data is not inputted, and the gray expresses the frame in which the camera key data cannot be inputted. The frame in which the camera key data is inputted is expressed in blue and green, and the motion of the virtual camera in a length between the frames is displayed while related to key data. The blue expresses the frame in which the camera key data is inputted. Although the green expresses the camera key data is inputted like the blue, the green expresses the frame in which the virtual camera moves so as to fill a gap to a next position of the virtual camera. A "Δ" mark in the frame display region 61a expresses the camera key data with respect to the frame. When the information on the previous and next frames is displayed, the player can recognize the edit status to perform the high-level edit. A numerical character, which is displayed on the right of a camera mark 61b provided in the upper right of the display screen 24, expresses the remaining number of the pieces of camera key data that can be registered in the reproducing frame. For example, when the 200 pieces of camera key data can maximally be registered, the numerical character is decremented from 200 every time the registration is made. The registration cannot be made when the numerical character becomes zero. In FIG. 8, when the numerical character of 100 is expressed, the 100 pieces of camera key data can be registered yet.

The action of each key of the input device 21 is displayed in the edit function display region 62. For example, the R button 34 acts as "function switching" the L button 35 acts as "frame-by-frame advance", the "○" mark button 32a acts as "camera data registration", the "Δ" mark button 32d acts as "camera mode switching", the "☐" mark button 32c acts as "camera data deletion" the "x" mark button 32b is "camera reset", the arrow key 31 acts as "camera rotation", the joystick 36 acts as "camera XZ movement" and the select button 37 acts as "preview mode". When the R button 34 is pressed, the function displayed in the edit function display region 62 is switched to display another function. When the L button 35 is pressed, the game screen advances to the next frame by the frame-by-frame advance function. When the "Δ" mark button 32d is pressed, a camera mode can be switched, and the switched camera mode is registered by pressing the "○" mark button 32a. The arrow key 31 can rotate the virtual camera in all the directions while the position of the virtual camera is not changed. The registered camera data can be deleted by pressing the "☐" mark button 32c. The joystick 36 can move the position of the virtual camera in an XZ plane of the viewpoint coordinate system while fixing the direction of the visual axis 44. The position of the virtual camera can be moved in a XY plane of the viewpoint coordinate system using the function of "camera XY movement", which is displayed on the display screen 24 when the function is switched by pressing the R button 34. Using the function of "roll/zoom" that is displayed on the display screen 24 by performing the function switching, the virtual camera can be inclined while the visual axis 44 is fixed, or the virtual camera can be zoomed while a focus is fixed to the character. Therefore, the replay display can be performed while the game screen is inclined at 45 degrees or 90 degrees, and the character can be displayed at an extremely close range. The replay display resumes by pressing the select button 37.

Examples of the camera mode include "free camera", "seeing 1P", "seeing 2P", "seeing 1P and 2P", "supplement; free camera", "supplement: seeing 1P", "supplement: seeing 2P", "supplement: seeing 1P and 2P", "battle camera 1P", and "battle camera 2P". In the "free camera" mode, the position of the virtual camera can freely be moved and fixed. The "seeing 1P" mode and the "seeing 2P" mode are camera modes in which subjects of the 1P (usually, player character) and 2P (usually, enemy character) are chased as the focus by rotating the scene around the position of the virtual camera. In the "seeing 1P and 2P" mode, the scene is rotated around the position of the virtual camera like the "seeing 1P" mode and the "seeing 2P" mode. However, the coordinate in the center of 1P and 2P is chased in the "seeing 1P and 2P" mode. The focus of the virtual camera can be changed by changing the camera mode, and the position of the virtual camera is inevitably changed. In the "supplement: free camera" mode, the "supplement: seeing 1P" mode, the "supplement: seeing 2P" mode, and the "supplement: seeing 1P and 2P" mode, the subject is displayed while the virtual camera is moved from the position of the reproducing virtual camera to the next position of the virtual camera. The "battle camera 1P" mode is a camera mode usually used in the game and a combined camera mode in which the 1P side is dealt with as the player. Usually the "battle camera 1P" mode is set by default, and the "battle camera 1P" mode is used when the replay display is performed to the replay data to which the replay storage is performed after the player causes the game to progress. The "battle camera 2P" mode is a camera mode usually used in the game and a combined camera mode in which the 2P side is dealt with as the player. When the "battle camera 2P" mode is used, the game status can be replicated from the viewpoint of the opponent party of the fight.

Any cut can be extracted by editing the replay data, and the cut can be stored as the replay data. For example, only 30-second cut can be extracted from the 10-minute replay data and stored as the replay data.

Figure 9:
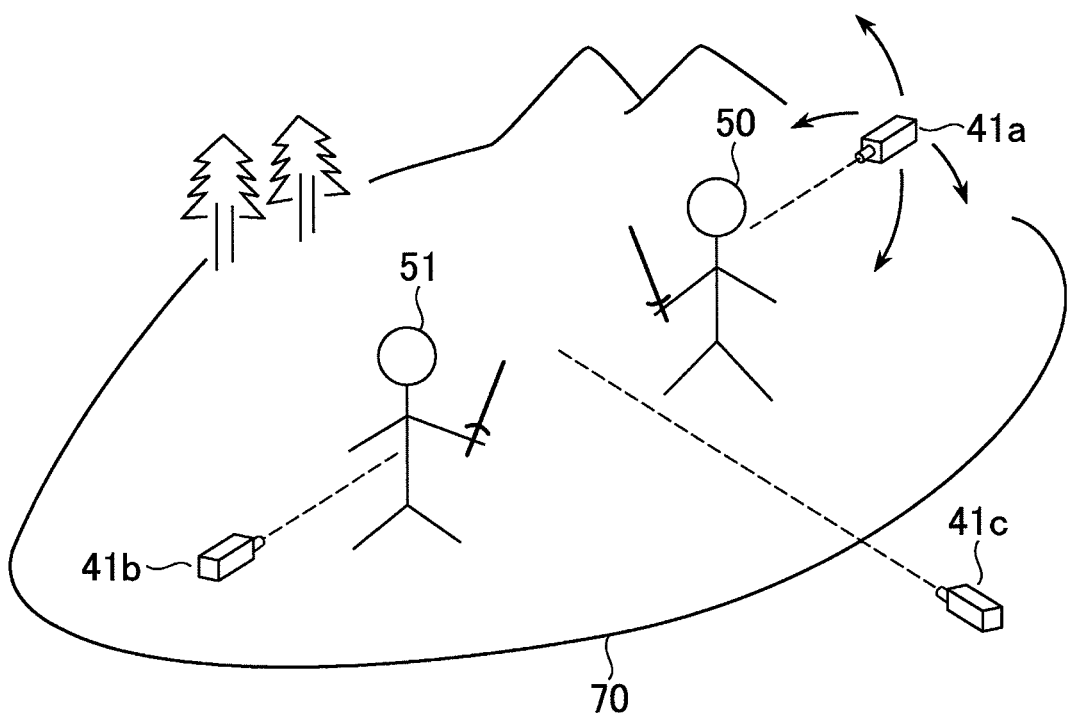
FIG. 9 schematically illustrates a relationship between a virtual camera and a character.

FIG. 9 schematically illustrates a relationship between the virtual camera and the player character. The battle erupts between the player character 50 and the enemy character 51 in a battle field 70. Assuming that 1P is the player character, 2P is the enemy character operated by CPU, and the camera mode of the virtual camera is set to the "seeing 1P" mode, the perspective transformation is performed based on the viewpoint from the virtual camera 41a. When the player character 50 moves, the virtual camera 41a moves by following the motion of the player character 50. The virtual camera 41a can move in any direction on the instruction of the player.

In the edit mode, when the player presses the "Δ" mark button 32d of the input device 21, the camera mode is switched to the "seeing 2P" mode, the perspective transformation is performed based on the viewpoint from the virtual camera 41b, and the player character 50 and the enemy character 51 are displayed on the display screen 24. The virtual camera 41b moves by following the motion of the enemy character 51. When the player further presses the "Δ" mark button 32d of the input device 21, the camera mode is switched to the "seeing 1P and 2P" mode, the perspective transformation is performed based on the viewpoint from the virtual camera 41c, and the player character 50 and the enemy character 51 are displayed on the display screen 24. The virtual camera 41c moved in synchronization with the motions of the player character 50 and enemy character 51 so as to look down on these characters.

The replay data stored in the memory card 28 can be converted into a moving image file. In such cases, an appropriate free space is necessary for the memory card 28. The player can select image quality of the moving image file from low image quality, standard image quality, and high image quality. The data capacity is increased as the image quality is enhanced. When a free space corresponding to a capacity of the converted moving image file does not remain in the memory card 28, an error is displayed, and the conversion into the moving image file cannot be performed. The converted moving image file is pursuant to both the Motion JPEG format and the MPEG format, and the moving image file can be uploaded on a moving image posting site.

The player can perform wireless communication with a video game apparatus of another user to transmit the replay data to the video game apparatus, and proud one scene edited by the player can be shared by other users.

In the embodiment, the player character operated by the player fights against the enemy character operated by CPU. Alternatively, plural players can fight against one another through the wireless communication to perform the replay display of the fight scene. In such cases, the statuses of all the player characters fighting against one another and the pieces of motion input information for each frame unit, inputted by all the players, are stored in the storage region, and the fighting scene is replicated in response to the replay display request of the player.

In the embodiment, the player can control the position, focus, and inclination of the virtual camera. Additionally, the character status of the player character can be changed. For example, when the player character is in "LEVEL 5", the setting can be changed to "LEVEL 6" to perform the replay display. Therefore, a simulation in how the game result is obtained in "LEVEL 6" against the enemy character that the player character of "LEVEL 5" cannot win can be performed. Further, a simulation in which a weapon and a protective guard of the player character are replaced can be performed.

The action RPG is described in the embodiment. However, the present invention can be applied to other games as long as the result fluctuates in accordance with the status of the character. For example, the present invention can be applied to shooting games and sports games such as a baseball game.

What is claimed is:

1. A game apparatus, in which a game is caused to progress in accordance with an input from a player, a game image obtained by causing the game to progress is displayed on a display, and a replay display in which the game image is replicated is displayed on the display in response to a replay display request of the player, the game apparatus comprising:
   a motion input that inputs motion input information for operating a player character in a virtual three-dimensional space in accordance with a first operation of the player;
   a first game progress controller that controls a first game progress in accordance with a character status of the player character, the motion input information, and random numbers generated using a value during the first game progress;
   a storage that stores the character status of the player character, the motion input information, and the value;
   a second game progress controller that reads the character status, the motion input information, and the value from the storage in response to the replay display request of the player, and controls a second game progress in accordance with the character status of the player character, the motion input information, and the random numbers generated using the value during the first game progress;
   a virtual camera control information input that inputs virtual camera control information on control of one of a position, a focus, and an inclination of a virtual camera in accordance with a second operation of the player;
   a replay perspective transformer that performs perspective transformation of the virtual three-dimensional space based on the virtual camera control information in accordance with a result of the second game progress; and a display controller that performs the replay display by replaying the game image replicated by the replay perspective transformer on the display, wherein the value is used during the first game progress to determine initial values of plural events with the initial values being used to generate the random numbers to calculate effects of the plural events, and the value is read in response to the replay display request to replicate the effects of the plural events during the replay display, wherein the storage stores the virtual camera control information, wherein the replay perspective transformer performs the perspective transformation of the virtual three-dimensional space based on the virtual camera control information which is stored by the storage and the virtual camera control information which is input by the virtual camera control information input, and wherein, when the second operation of the player is received while the replay display of the game is performed, the replay perspective transformer performs the perspective transformation based on the virtual camera control information which is input by the virtual camera control information input.

2. The game apparatus according to claim 1, further comprising:
a data changer that converts a plurality of replicated game images into a moving image file.

3. The game apparatus according to claim 1, further comprising:
a game perspective transformer that reads the character status, the motion input information, and the value from the storage during the first game progress, and performs a game perspective transformation of the virtual three-dimensional space to generate the game image based on the character status, the motion input information, and the value,
wherein the display controller displays the game image generated by the game perspective transformer on the display during the first game progress.

4. The game apparatus according to claim 1, wherein the value is a starting time of the game.

5. The game apparatus according to claim 1, wherein one of the plural events is a battle between the player character and an enemy character and one of the effects is damage to one of the player character and the enemy character.

6. The game apparatus according to claim 1, further comprising:
an end game prompt that requests, of the player, when an ending condition of the game is satisfied, whether the character status, the motion input information, and the value are to be stored in the storage for performing the replay display after the game ends.

7. A game replay displaying method performed by a computer, in which a game is caused to progress in accordance with an input from a player, a game image obtained by causing the game to progress is displayed on a display, a replay display in which the game image is replicated is displayed on the display in response to a replay display request of the player, the game replay displaying method comprising:
receiving, at an input, motion input information for operating a player character in a virtual three-dimensional space in accordance with a first operation of the player;
controlling, with a processor, a first game progress in accordance with a character status of the player character, the motion input information, and random numbers generated using a value during the first game progress;
storing, in a memory, the character status of the player character, the motion input information, and the value;
reading, with the processor, the character status, the motion input information, and the value from the memory in response to the replay display request of the player, and controlling, with the processor, a second game progress in accordance with the character status of the player character, the motion input information, and the random numbers generated using the value during the first game progress;
receiving, at the input, virtual camera control information on control of one of a position, a focus, and an inclination of a virtual camera in accordance with a second operation of the player;
performing, with a graphics processor, perspective transformation of the virtual three-dimensional space based on the virtual camera control information in accordance with a result of the second game progress; and
performing, with the processor, the replay display by replaying the game image replicated by the graphics processor on the display, wherein the value is used during the first game progress to determine initial values of plural events with the initial values being used to generate the random numbers to calculate effects of the plural events, and the value is read in response to the replay display request to replicate the effects of the plural events during the replay display, wherein a storage stores the virtual camera control information,
wherein the perspective transformation of the virtual three-dimensional space is performed based on the virtual camera control information which is stored by the storage and the virtual camera control information which is received at the input, and
wherein, when the second operation of the player is received while the replay display of the game is performed, the perspective transformation is performed based on the virtual camera control information which is received at the input.

8. The game replay displaying method according to claim 7, further comprising:
reading, with the processor, the character status, the motion input information, and the value from the memory during the first game progress;
performing, with the graphics processor, a game perspective transformation of the virtual three-dimensional space to generate the game image based on the character status, the motion input information, and the value; and
displaying, with the processor, the game image generated by the game perspective transformation on the display during the first game progress.

9. The game replay displaying method according to claim 7, wherein the value is a starting time of the game.

10. The game replay displaying method according to claim 7, wherein one of the plural events is a battle between the player character and an enemy character and one of the effects is damage to one of the player character and the enemy character.

11. The game replay displaying method according to claim 7, further comprising:
requesting, via the interface and of the player, when an ending condition of the game is satisfied, whether the character status, the motion input information, and the value are to be stored in the memory for performing the replay display after the game ends.

12. A non-transitory computer-readable recording medium including a game program that is executable by a computer apparatus, the game program including a game that is caused to progress in accordance with an input from a player to the computer, a game image obtained by causing the game to progress being displayable on a display of the computer, a replay display in which the game image is replicated being displayable on the display in response to a replay display request of the player to the computer, the non-transitory computer-readable recording medium comprising:

- a motion inputting segment that, when executed, inputs motion input information for operating a player character in a virtual three-dimensional space in response to a first operation of the player;
- a first game progress controlling segment that, when executed, controls a first game progress in accordance with a character status of the player character, the motion input information, and random numbers generated using a value during the first game progress;
- a storing segment that, when executed, stores the character status of the player character, the motion input information, and the value;
- a second game progress controlling segment that, when executed, reads the character status, the motion input information, and the value from a storage in response to the replay display request of the player, and controls a second game progress in accordance with the character status of the player character, the motion input information, and the random numbers generated using the value during the first game progress;
- a virtual camera control information inputting segment that, when executed, inputs virtual camera control information on control of one of a position, a focus, and an inclination of a virtual camera in accordance with a second operation of the player;
- a perspective transforming segment that, when executed, performs perspective transformation of the virtual three-dimensional space based on the virtual camera control information in accordance with a result of the second game progress; and
- a display controlling segment that, when executed, performs the replay display by replaying the game image replicated by the perspective transforming segment on the display, wherein the value is used during the first game progress to determine initial values of plural events with the initial values being used to generate the random numbers to calculate effects of the plural events, and the value is read in response to the replay display request to replicate the effects of the plural events during the replay display, wherein the storage stores the virtual camera control information, wherein the perspective transforming segment performs the perspective transformation of the virtual three-dimensional space based on the virtual camera control information which is stored by the storage and the virtual camera control information which is input by the virtual camera control information inputting segment, and wherein, when the second operation of the player is received while the replay display of the game is performed, the perspective transforming segment performs the perspective transformation based on the virtual camera control information which is input by the virtual camera control information inputting segment.

13. The non-transitory computer-readable recording medium according to claim 12, further comprising:
- a game perspective transforming segment that, when executed, reads the character status, the motion input information, and the value during the first game progress, and performs a game perspective transformation of the virtual three-dimensional space to generate the game image based on the character status, the motion input information, and the value; and
- a game display controlling segment that, when executed, displays the game image generated by the game perspective transforming segment on the display during the first game progress.

14. The non-transitory computer-readable recording medium according to claim 12, wherein the value is a starting time of the game.

15. The non-transitory computer-readable recording medium according to claim 12, wherein one of the plural events is a battle between the player character and an enemy character and one of the effects is damage to one of the player character and the enemy character.

16. The non-transitory computer-readable recording medium according to claim 12, further comprising:
- an end game prompting segment that, when executed, requests, of the player, when an ending condition of the game is satisfied, whether the character status, the motion input information, and the value are to be stored in the memory for performing the replay display after the game ends.

* * * * *